Aug. 20, 1957 A. H. WILKINSON 2,803,326
DRIVE SELECTOR
Filed Feb. 27, 1956 3 Sheets-Sheet 1

INVENTOR.
Alvin H. Wilkinson.
BY
Fishburn and Gold
ATTORNEYS.

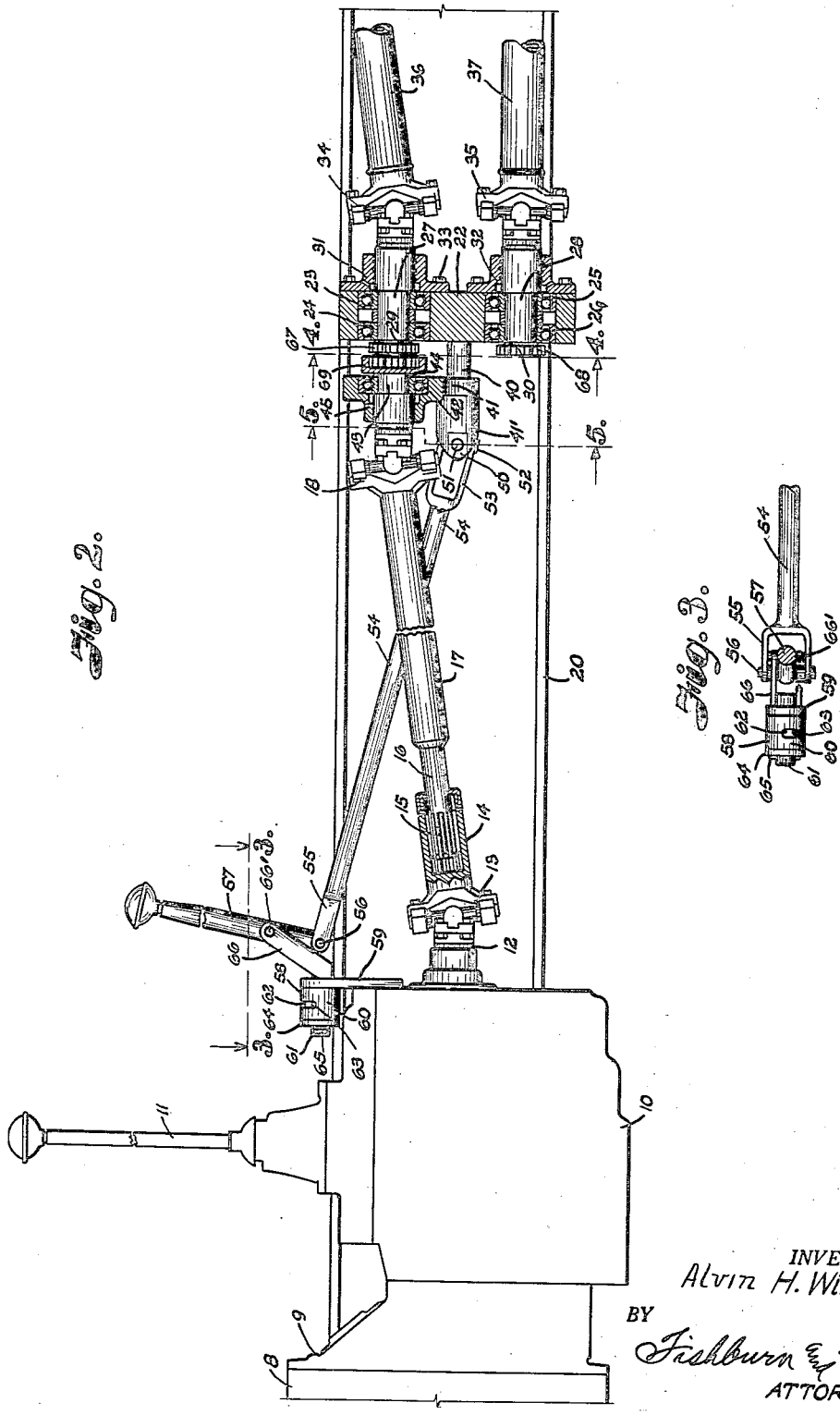

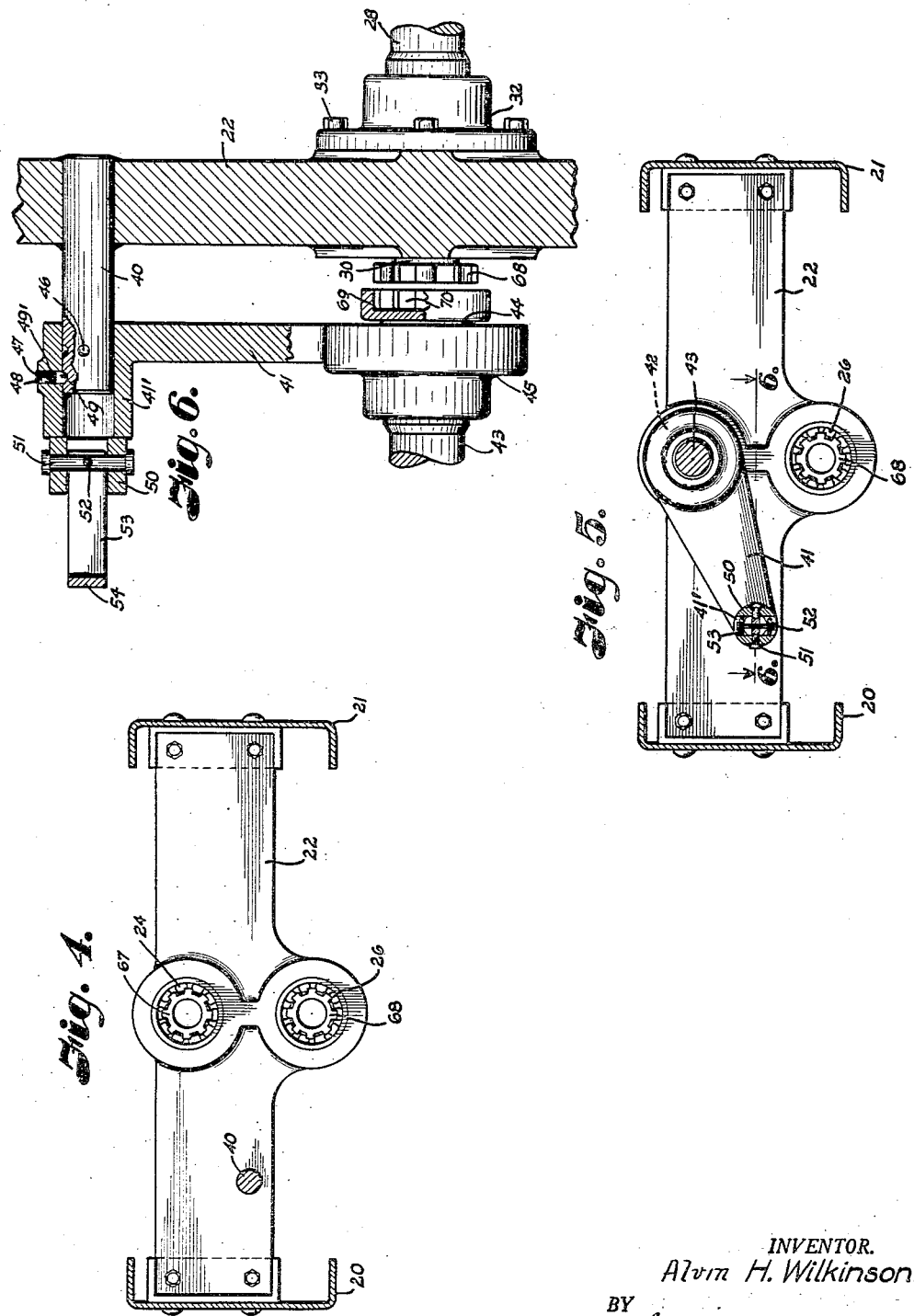

United States Patent Office 2,803,326
Patented Aug. 20, 1957

2,803,326

DRIVE SELECTOR

Alvin H. Wilkinson, Talala, Okla.

Application February 27, 1956, Serial No. 567,911

5 Claims. (Cl. 192—48)

This invention relates to a drive selector, and more particularly to apparatus which may be carried by a self propelled unit such as trucks, tractors, or the like, for selectively driving units carried thereby or associated therewith.

The principal objects of the present invention are to provide a selective drive mechanism adapted for diverting the power to selected units from a common source of power such as a truck or tractor; to provide apparatus for operating a drum mechanism for raising of a derrick or other units connected with such construction by operation of a lever to divert the power from one mechanism to another; to provide a propeller shaft assembly having sliding connections with a sleeved member having universal joint connection with the transmission shaft of the truck or tractor; to provide a stub shaft having a universal joint connection with the propeller shaft assembly; to provide a pair of shafts here shown to be in upper and lower position adapted to be engaged with the stub shaft selectively; to provide upper and lower propeller shafts having connection to the propeller shaft assembly through the stub shaft in selected positions; to provide a rod having an arm for supporting a bearing for the stub shaft and having one end connected to a control rod having one end connected to a lever which in turn is connected to a toggle for shifting the stub shaft into and out of connection with the upper and lower short shaft and for movement of the stub shaft into connection with either of said upper and lower shafts; to provide a trunnion bracket for rotation of the shaft lever to transfer the stub shaft from one unit to the other and to provide a device of this character simple and economical to manufacture.

Fig. 2 is a side view, partly in cross section, particularly illustrating the driving assemblies and their selective connection with the propeller shaft assembly.

Fig. 3 is a fragmentary view of the control rod and shift lever.

Fig. 4 is an enlarged cross sectional view taken on a line 4—4, Fig. 2.

Fig. 5 is an enlarged cross sectional view taken on a line 5—5, Fig. 2.

Fig. 6 is an enlarged cross sectional view taken on a line 6—6, Fig. 5.

Figure 1:
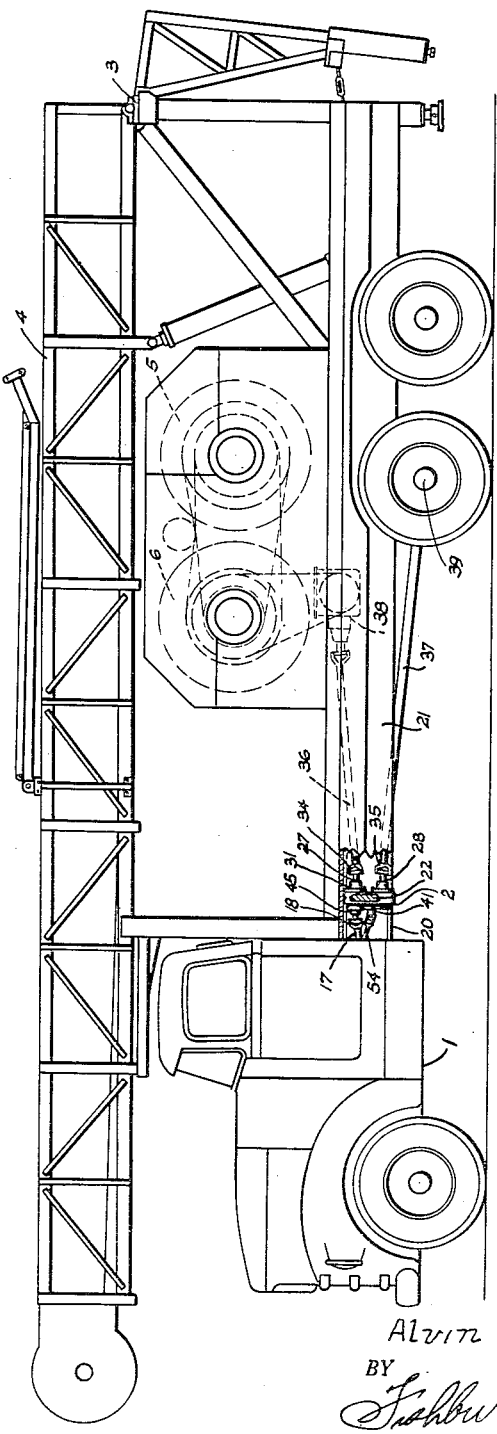
Fig. 1 is a side view of my apparatus shown attached to the universal of a truck with one drive assembly for operating the vehicle and the other drive assembly for operating a unit carried by the truck.

Referring more in detail to the drawings:

1 designates a truck or other vehicle upon which my apparatus is mounted as indicated at 2, and 3 is a frame of the vehicle upon which a mast or the like 4 is pivotally mounted. The frame carries a plurality of drums as indicated at 5 and 6 adapted to be driven by my drive assembly as shown in dotted lines in Fig. 1.

8 designates the flywheel housing connected to a bell housing 9 of a transmission housing 10 in which is housed a transmission gearing as is the usual practice having a transmission lever 11 extending upwardly therefrom. A transmission shaft 12 extends outwardly from the rear of the transmission housing as illustrated in Fig. 2 and connects with a universal joint 13 to which is attached a slip yoke 14 internally splined and adapted to receive the splined end 15 of a stub shaft 16 of a propeller shaft assembly 17 having a universal connection 18 on its other end for a purpose later described.

The frame of the tractor includes side rails 20 and 21 upon which is mounted a hanger or bracket member 22 having spaced ball bearings as indicated at 23 and 24 and 25 and 26 spaced from each other as best illustrated in Fig. 2, for receiving upper and lower short shafts 27 and 28. The bearings are retained in the hanger by rings 29 and 30 and sleeved collars 31 and 32 secured to the hanger bracket by bolts as indicated at 33. The shafts are provided on their rear ends with universal joint connections 34 and 35 with an upper propeller shaft assembly 36 and a lower propeller shaft assembly 37, the former leading to a unit to be carried by the truck as indicated at 38 and the shaft 37 leading to the rear axle 39 of the truck as illustrated in Fig. 1.

Rigidly mounted in the hanger bracket 22 and extended forwardly thereof is a shaft or arm 40 on which is rotatably mounted an arm 41 to which is mounted a ball bearing 42 for a stub shaft 43 having universal connection with the propeller shaft assembly 17 as indicated at 18, previously mentioned. The bearing 42 is held in place by a retainer ring 44 and retaining collar 45 on the selector arm. The arm 41 has a sleeved end 41' which engages over the rod or arm 40 and the shaft is provided with depressions or recesses as indicated at 46 and the sleeve is provided with an opening 47 internally threaded to receive a screw 48. A ball 49 moves in the inner end of the threaded opening 47 and a spring 49' is provided between the screw 48 and the ball 49 to urge the ball into the recess 46 for a purpose, later described.

The sleeved end of the arm 40 is bifurcated as indicated at 50 and extending across the bifurcation is a pin 51 which is secured by pin 52 to the bifurcated end 53 of a control rod 54 having its other end bifurcated as indicated at 55 and having a pin 56 extending through the lower end of a shift lever 57. A trunnion 58 is secured to the transmission 10 by a bracket 59 and includes a housing 60 for receiving a trunnion arm or rod 61. The housing 60 is provided with a slot 62 adapted to receive a lug 63 on the rod 61. The trunnion arm or rod 61 is held in the trunnion housing by a washer 64 and a cotter key or the like 65. Secured to the opposite end of the trunnion rod is a toggle link 66 pivotally connected to the shift lever 57 by a pin or the like 66' spaced from the pivoted end 56 of the shift lever. When the trunnion rod 61 is rotated in the housing 60 by lever 57 the lug 63 provided on the rod will move in the slot 62, the slot thereby providing a guide and stop when the shift lever is moved to the right or left as later shown. The toggle member 66 extends upwardly and outwardly to provide a fulcrum point for the lever 57, and also a stop when the lever is moved rearwardly as shown in Fig. 2 and Fig. 3.

The upper and lower shafts 27 and 28 are provided on their forward ends with enlarged portions and are externally splined as indicated at 67 and 68. The stub shaft 43 has an enlarged end rearwardly of the arm 41 and has an open or socket end as indicated at 69 provided with internal grooves or serrations 70. The grooved socket is adapted to be selectively extended over and engaged with the splined ends 67 and 68 of the shafts 27 and 28 to connect with the shafts 36 and 37 to drive the tractor unit or power unit on the tractor as desired.

Operation of apparatus constructed and assembled as described is as follows:

The apparatus as shown in Fig. 2 is in idle position, i. e., neither of the shafts 36 or 37 are operating. If it is desired to move the truck the shift lever 57 is rotated on the trunnion bracket 59 to move the arm 41 so that the internally serrated or grooved end 69 of the stub shaft 43 will be rotated on the shaft 40 through the control rod 54 to bring the socket 69 in alignment with the splined end 68 of the shaft 28, and the lever moved forwardly to bring the stub shaft 43 into engagement with the splined end 68 of the short shaft 28 to drive the tractor through connection of the shaft 37 with the axle 39 of the tractor. When the tractor or truck is located at the desired location and it is desired to operate a unit thereon as indicated at 5 and 6 the shift lever is moved rearwardly with respect to the transmission to disengage the stub shaft from the short shaft 28 and rotation of the shift lever to the right will move the stub shaft back in alignment with the short shaft 27. Then movement of the shift lever forward will cause engagement of the socket end of the stub shaft with the splined end 67 of the shaft 27 for operating of the power unit 6 on the truck.

It will be obvious that movement of the shift lever 57 to the left will cause the bracket arm to move to the right to engage the stub shaft with the shaft 28 and when it is desired to engage the stub shaft with the shaft 27 the operation is reversed. Length of movement to align the stub shaft with the shafts 27 and 28 is controlled by the stop groove in the trunnion and the lug on the trunnion rod 66. The spring urged ball 49 engaging in the recess 46 will hold the stub shaft in engagement with the shafts 27 and 28 or in disengaged position as shown in Fig. 6.

While I have here shown the hanger bracket 22 rigidly mounted on the frame and the bracket arm rotatably mounted on the rod 40 secured to the bracket, it is obvious that the reverse could be accomplished by making the bracket arm rigid and rotating of the other parts.

It will be further obvious that friction loss is minimized in the construction herein shown due to elimination of gears and it will also permit use of full power of the engine to drive the selected unit.

What I claim and desire to secure by Letters Patent is:

1. A drive selector of the character described for attachment to a vehicle having a frame and a transmission housing and a shaft comprising, a propeller shaft assembly, said assembly including a spline on one end of the shaft engaging in an internally serrated sleeve of a yoke universally connected to said transmission shaft, a hanger supported on said frame, vertically spaced bearings in said hanger, short shafts in said bearings, a pair of propeller shafts universally connected to one end of the short shafts, the other ends of said short shafts being splined, a rod rigidly secured to and extending forwardly of said hanger, an arm having a sleeved end pivotally mounted on said rod, a bearing in said arm, a stub shaft in said bearing having one end universally connected to the propeller shaft assembly and having its other end serrated to fit over the splined ends of the short shafts, a control rod having one end universally connected to said forwardly extending rod, a trunnion bracket secured to said transmission housing, a toggle link secured to said trunnion, and a lever pivotally connected at its lower end to said control rod and to said link at a point spaced from the lower end of the lever whereby said stub shaft may be disengaged from engagement with one of said short shafts and moved to engagement with the other short shaft.

2. A drive selector of the character described for attachment to a vehicle having a frame and a transmission housing and a shaft comprising, a propeller shaft assembly, said assembly including a spline on one end of the shaft engaging in an internally serrated sleeve of a yoke universally connected to said transmission shaft, a hanger supported on said frame, vertically spaced bearings in said hanger, short shafts in said bearings, a pair of propeller shafts universally connected to one end of the short shafts, the other ends of said short shafts being splined, a rod rigidly secured to and extending forwardly of said hanger, an arm having a sleeved end pivotally mounted on said rod, a bearing in said arm, a stub shaft in said bearing having one end universally connected to the propeller shaft assembly and having its other end serrated to fit over the splined ends of the short shafts, a control rod having one end universally connected to said forwardly extending rod, a trunnion bracket secured to said transmission housing, a toggle link secured to said trunnion, a lever pivotally connected at its lower end to said control rod and to said link at a point spaced from the lower end of the lever whereby said stub shaft may be disengaged from engagement with one of said short shafts and moved to engagement with the other short shaft, and means on said rod and said sleeve cooperating to lock said stub shaft in engagement with said short shafts.

3. A drive selector of the character described for attachment to a vehicle having a frame and a transmission shaft comprising, a propeller shaft assembly, said assembly including cooperative extensible telescoping drive members one of which is universally connected to said transmission shaft, a hanger supported on said frame, spaced bearings having parallel axes carried by the hanger, a pair of driven shafts rotatably mounted in said bearings and extending therethrough, splined ends on the driven shafts and extending from the bearings toward the transmission shaft, an arm at the side of the hanger toward the transmission shaft and having one end rotatable and longitudinally slidable on an axis parallel and equally spaced from the axes of the driven shafts, a bearing in the arm alignable in axial relation to the driven shafts, a stub shaft rotatable in said arm bearing and having one end universally connected to the propeller shaft assembly for rotation thereby, the other end of said stub shaft extending from the arm toward the hanger and having splines to mesh with the respective splined ends of the driven shafts, and means connected with the arm for moving same axially of the bearing axis to disengage the splined end of the stub shaft from one of the driven shafts and swinging said arm to axial alignment of the stub shaft with the other driven shaft and moving the arm axially for driving engagement of the splined end of the stub shaft with the splined end of said other driven shaft.

4. A drive selector of the character described for attachment to a vehicle having a frame and a transmission housing and shaft comprising, a propeller shaft assembly, said assembly including cooperative extensible telescoping drive members one of which is universally connected to said transmission shaft, a hanger supported on said frame, spaced bearings having parallel axes carried by the hanger, a pair of driven shafts rotatably mounted in said bearings and extending therethrough, splined ends on the driven shafts and extending from the bearings toward the transmission shaft, an arm at the side of the hanger toward the transmission shaft and having one end rotatable and longitudinally slidable on an axis parallel to and equally spaced from the axes of the driven shafts, a bearing in the arm alignable in axial relation to the driven shafts, a stub shaft rotatable in said arm bearing and having one end universally connected to the propeller shaft assembly for rotation thereby, the other end of said stub shaft extending from the arm toward the hanger and having splines to mesh with the respective splined ends of the driven shafts, a control rod having one end connected to said arm, a trunnion bracket fixed relative to the transmission housing, a lever pivotally supported on the trunnion bracket and pivotally connected to the control rod whereby said stub shaft may be disengaged from engagement with one of said driven shafts and moved to driving engagement with the other driven shaft.

5. A drive selector of the character described for attachment to a vehicle having a frame and a transmission housing and shaft comprising, a propeller shaft assembly, said assembly including cooperative extensible telescoping drive members one of which is universally connected to said transmission shaft, a hanger supported on said frame, spaced bearings having parallel axes carried by the hanger, a pair of driven shafts rotatably mounted in said bearings and extending therethrough, splined ends on the driven shafts and extending from the bearings toward the transmission shaft, an arm at the side of the hanger toward the transmission shaft and having one end rotatable and longitudinally slidable on an axis parallel to and equally spaced from the axes of the driven shafts, a bearing in the arm alignable in axial relation to the driven shafts, a stub shaft rotatable in said arm bearing and having one end universally connected to the propeller shaft assembly for rotation thereby, the other end of said stub shaft extending from the arm toward the hanger and having splines to mesh with the respective splined ends of the driven shafts, a control rod having one end connected to said arm, a trunnion bracket secured to said transmission housing, a toggle link secured to said trunnion, and a lever pivotally connected at its lower end to said control rod and to said link at a point spaced from the lower end of the lever whereby said stub shaft may be disengaged from engagement with one of said driven shafts and moved to engagement with the other driven shaft.

References Cited in the file of this patent

UNITED STATES PATENTS

| 1,754,133 | Van Der Ploeg | Apr. 8, 1930 |

FOREIGN PATENTS

| 25,294 | Great Britain | Nov. 9, 1906 |
| 564,765 | Great Britain | Oct. 12, 1944 |